United States Patent [19]

Hertrich

[11] Patent Number: 4,874,975
[45] Date of Patent: Oct. 17, 1989

[54] BRUSHLESS DC MOTOR

[75] Inventor: Friedrich R. Hertrich, Boulder, Colo.

[73] Assignee: Digital Equipment Corporation, Maynard, Mass.

[21] Appl. No.: 127,625

[22] Filed: Dec. 1, 1987

Related U.S. Application Data

[63] Continuation of Ser. No. 670,958, Nov. 13, 1984, abandoned.

[51] Int. Cl.[4] .............................................. H02K 1/10
[52] U.S. Cl. .................................... 310/186; 310/156; 310/179; 310/187; 310/254; 318/254
[58] Field of Search ............ 310/40 MM, 68 R, 63 A, 310/177, 46, 254, 156, 180, 184, 185, 186, 187, 188, 192, 193, 261, 269, 216, 259, 179; 318/254

[56] References Cited

U.S. PATENT DOCUMENTS

| | | | |
|---|---|---|---|
| 2,110,719 | 3/1938 | Williamson | 310/187 |
| 3,860,843 | 1/1975 | Kawasaki | 310/156 |
| 4,280,072 | 7/1981 | Gotou | 310/156 |
| 4,386,287 | 5/1983 | Karasawa et al. | 310/156 |
| 4,393,320 | 7/1983 | Anderson | 310/217 |
| 4,405,883 | 9/1983 | Ashida | 310/54 |
| 4,405,885 | 9/1983 | Okamoto | 318/138 |
| 4,451,752 | 5/1984 | Tahara | 310/180 |
| 4,692,645 | 9/1987 | Gotou | 310/184 |
| 4,692,646 | 9/1987 | Gotou | 310/184 |

FOREIGN PATENT DOCUMENTS

| | | | |
|---|---|---|---|
| 0016473 | 10/1980 | European Pat. Off. | 310/46 |
| 1042093 | 10/1958 | Fed. Rep. of Germany | 310/187 |
| 8015057 | 7/1982 | Fed. Rep. of Germany | |
| 0043513 | 4/1979 | Japan | 310/46 |
| 0062056 | 5/1981 | Japan | 310/185 |
| 0117436 | 4/1958 | U.S.S.R. | 310/186 |

Primary Examiner—R. Skudy
Attorney, Agent, or Firm—Nutter, McClennen & Fish

[57] ABSTRACT

A brushless DC motor having a number of armature poles which is neither a multiple nor a submultiple of the number of field poles, thereby providing a relatively high cogging-ripple frequency. The field pole faces, which are generally arcuate in cross-section, have centrally disposed depressions. These depressions reduce the torque exerted by the armature when pole boundaries of the armature pass by the centers of the field poles. This reduces both torque ripple and cogging ripple and it doubles the frequency of torque ripple.

9 Claims, 1 Drawing Sheet

BRUSHLESS DC MOTOR

This application is a continuation of application Ser. No. 670,958, filed Nov. 13, 1984, now abandoned.

BACKGROUND OF THE INVENTION

This invention relates to a multiple-phase, brushless DC motor. More particularly, it relates to a motor characterized by relatively low cost as well as reduced cogging and torque ripple effects.

The invention is directed to small motors in applications where smoothness of output, low cost and compactness of size are highly desirable. An example of such an application is a magnetic tape drive for multiple track tapes contained in small cartridges or cassettes. In most motors the torque varies with the angular position of the armature so that under load both the torque and the rotational velocity undergo cyclic variations. If the frequency of this ripple effect is within the pass band of a servo loop controlling the tape velocity or tension, it can upset the operation of the loop.

Also in a multiple-track tape drive with a single head, the head is moved across the tape to position it over selected tracks. Servo signals embedded in the tracks are used by a head-positioning servo loop to maintain the proper head position. Again, the ripple effect, which modulates the servo signals retrieved from the tape, can degrade operation of the positioning system.

Ripple is associated with both of the mechanisms by which an electric motor exerts torque. The first of these results essentially from variations in reluctance in the magnetic paths as a function of armature position. To the extent that there are such variations, the motor will exert a torque tending to rotate the armature to a position of minimum reluctance. In general, in a salient pole motor there are a plurality of such positions. In a motor employing permanent magnets in the armature, this phenomenon causes the armature to assume preferred rest positions in the absence of field excitation and for this reason it is often referred to as "cogging".

Torque is also produced by the interaction between fields generated in the armature and in the field. This torque is proportional to the variation of energy in the magnetic field in the air gap as a function of armature angle. It also is subject to ripple, since it varies with armature position.

The torque due to field interaction is substantially greater than the torque resulting from reluctance variation. Accordingly, when the motor operates under full power, the "torque ripple", due in the interaction torque is predominant. The "cogging ripple" is a substantial factor when the motor operates under reduced power, i.e. when it is decelerating, since the reluctance torque is then an appreciable part of the total torque.

Brushless DC motors are energized in multiple phase fashion, a three-phase arrangement usually being used for simplicity of circuitry. To minimize ripple, the windings are generally connected in a delta arrangement. Moreover, to obtain substantial torque in a compact size, the armature magnets are generally made of relatively expensive rare earth elements. The principle object of the present invention is to provide a brushless DC motor having a small size and characterized by relatively high efficiency and low ripple content in the mechanical output of the motor.

SUMMARY OF THE INVENTION

In a motor incorporating the invention, the field has a number of pole pairs corresponding to the number of phases in the electrical excitation, as is conventional in brushless DC motors. However, whereas delta winding connections are usually used where low torque ripple is desired, the motor described herein is connected in a wye arrangement, with the coils on each pole pair connected in series and with the opposite sense. Specifically, all field poles have the same magnetic polarity when the coils are electrically excited. This arrangement reduces to one the number of electronic switches in series with each pair of field coils. It thus reduces the voltage drop due to switching, thereby maximizing efficiency and torque as compared with delta-connected motors.

With the foregoing switching arrangement, the number of poles on the armature is a multiple of four. Thus, diametrically opposed armature poles have the same magnetic polarity. Moreover, the number of armature poles is different from the number of field poles and neither is a multiple of the other.

Furthermore, since the field poles are arranged in diametrically opposed pairs, with both poles in each pair being energized simultaneously, magnetic forces of equal magnitude and opposite direction are exerted on the armature.

The net force exerted on the armature is therefore zero. This avoids ripple components due to lateral armature movement resulting from application of non-symmetrical forces to the armature.

The cross sections of the field pole faces are generally arcuate as is conventional. However, I have shaped them by providing centrally disposed depressions which increase the width of the armature-field air gap in the regions encompassed by the depressions. When a pole pair is excited, the torque exerted on the armature would go through a maximum, without this shaping, whenever a north-south armature boundary passed by the central region of the face of a magnetized field pole. The depressions in the pole faces reduce the change of net flux resulting from incremental armature rotation when an armature boundary passes by one of these regions and it thereby reduces the torque in that region as compared with the torque that would be exerted without pole-face shaping, and thereby materially reduces the amplitude of the torque ripple. Furthermore, the depth of each depression is preferably sufficient to reduce the torque in this region to slightly below the torque exerted on the armature when an armature boundary passes by the neighboring regions of the pole faces. This in essence doubles the number of torque peaks, thereby doubling the torque ripple frequency so as to displace it from the pass bands of the servo systems used in controlling speed and head position.

For similar reasons it is also desirable that the numbers of field and armature poles and the arcuate extent of each of the field poles be such that within any 180 degree sector no more than one armature pole boundary is opposite a space between two field poles at any given armature position.

Cogging ripple in the motor results from gap reluctance minima whose number is the least common multiple of the number of armature and field poles. For example, in a three-phase motor having six field poles and eight armature poles, the number of such minima is twenty-four, which again imparts a desirably high frequency to the cogging ripple.

Moreover, the positions of minimum reluctance, to which the armature is attracted in the cogging effect, occur when the north-south armature boundaries are opposite the centers of the pole faces. The pole shaping that reduces torque ripple by increasing the gap reluctance in these regions also reduces cogging ripple and, indeed, has been found to reduce it to an insignificant level in some embodiments of the motor.

DESCRIPTION OF THE PREFERRED EMBODIMENTS

Figure 1:
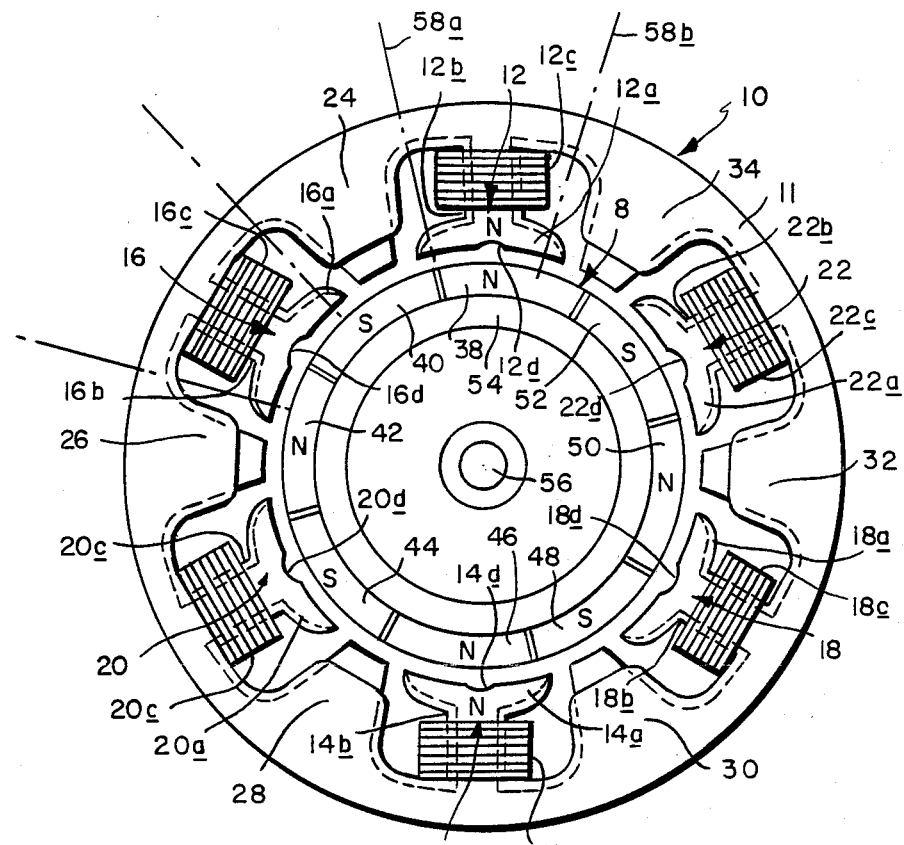
FIG. 1 is a cross-section showing the armature and field structure of the motor.

FIG. 1 illustrates the construction of a three-phase motor, embodying the invention, which comprises an armature 8 and a field 10. The field includes an outer ferromagnetic ring 11. Projecting inwardly from the ring 11 are three main pole pairs 12,14, 16,18, and 20,22. A set of auxiliary poles 24-34 are disposed between the main poles 12-22. The main poles comprise inner circumferentially extending shoes 12a-22a connected to the ring 11 by necks 12b-22b. The necks in turn support coils 12c-22c. The coils on each pole pair are connected in series in the opposite sense so that when a current is passed through a pair of coils their poles will have the same magnetic polarity relative to the armature 8.

The faces of the field poles are arcs of a circle centered on the axis of the motor. However, the central portions of the faces of the main poles depart from the arcuate shape in that they are depressed in their central regions as indicated at 12d-22d. These depressions, as explained herein, serve to reduce both torque ripple and cogging ripple.

The armature 8 in the illustrated motor comprises eight arcuate permanent magnets 38-52 forming an essentially continuous outer surface. The magnets 38-52, each of which has a surface that serves as one of the armature poles, are attached to an inner cylindrical ring 54 of ferromagnetic material. The ring 54, in turn, is suitably mounted on the motor shaft 56 by structural members not shown in the drawing.

In the illustrated motor, each of the main field poles 12-22 has an active region of 30°, i.e. one-half the field pole pitch of 60°. These regions are indicated by the radial marks 58a and 58b in the drawing. However, the main poles extend physically somewhat beyond these active regions, e.g. for a total span of 40°, to minimize fringing effects.

In considering operation of the motor assume, for example, that the armature pole boundaries 38,40 and 46,48 are opposite the radius marks 58a associated with the main poles 12 and 14 of the field 10. Assume also that the coils 12c and 14c are energized to provide the pole shoes 12a and 14a with the north magnetic polarity. Interaction of the magnetic fields provided by the armature and field will then rotate the armature 8 in the clockwise direction. When the armature has rotated 30° to bring the armature boundaries 38,40 and 46,48 opposite the radius marks 58b associated with the pole pair 12,14, the armature boundaries 42,44 and 50,52 will have reached positions opposite the radius marks 58a associated with the field pole pair 16,18. At this point the current applied to the coil pair 12c,14c is switched to the coil pair 16c,18c. The fields associated with the field pole pair 16,18 and opposed armature poles then continue the clockwise armature rotation.

Again, when the armature pole boundaries 42,44 and 50,52 reach the radius marks 58b associated with the pole pair 16,18, the armature pole boundaries 46,48 and 38,40 will have moved into position opposite the radius marks 58a associated with the field pole pair 20,22. At this point the motor current is switched to the coil pair 20c,22c and rotation then continues in response to the fields provided by the currents through those coils.

Switching of the currents continues in this fashion as long as rotation in the clockwise direction is desired. For counterclockwise rotation, the order of field coil excitation is reversed. For example, the coils might be excited in the order 12c,14c followed by 20c,22c and then 16c,18c.

If the faces of the main poles 12-22 were arcuate in cross-section throughout their circumferential extent, the torque exerted on the armature would pass through a peak whenever a pole boundary of the armature 8 passed by a central region of the face of an energized field pole. The depressions 12d-22d reduce these torque peaks by increasing the armature-field gap width, and thus decreasing the magnetic field, within these regions.

More specifically, consider the armature position depicted in FIG. 1, with the coil pair 12c,14c energized. The torque exerted on the armature 8 will be proportional to the change in net armature-developed flux through the pole 12 (or 14) with incremental rotation of the armature. The net armature flux through the pole 12 is the difference between the north-directed flux from the armature pole 38 and the south-directed flux from the armature pole 40, this difference varying according to how much of the face of the pole 12 is covered by each of the respective armature poles. Thus the change in armature flux through the pole 12 is the change in the difference between the fluxes from these two armature poles and it occurs opposite the armature pole boundary 38,40. In the absence of the depression 12d, the torque would exhibit a peak value as this boundary passes over the central region of the pole 12, the reason for this being lower reluctance because of lower saturation in the pole 12. The depression 12d increases the reluctance in the central region of the pole 12 and the torque is thus reduced from the peak value that it would have had in the absence of the depression.

The shaping of the torque-angle curve of the motor by means of the depressions 12d,22d is a function of angular extent and the depth of the depressions. Preferably the depressions are configured so as to make the torque exerted on the armature when a armature pole boundary passes by a depression slightly less than the torque exerted on the armature when the armature boundary is opposite a neighboring region of the pole face. Pole shaping in accordance with this invention thus reduces the effect of torque ripple in two ways. First, it reduces the torque peaks and thereby reduces the amplitude of torque ripple. Secondly, it provides a pair of torque peaks of low amplitude on opposite sides of each of the depressions 12d-22d. This doubles the frequency of the torque ripple, further lessening its effect on operation of the tape drive.

As an example of pole shaping in accordance with the invention, a motor has been constructed with an armature having an outer diameter of 1.75 inch and a field having an inner diameter of 1.8 inch, with a nominal armature-field gap of 0.025 inch. The pole shoes 12a–22a have a radial thickness of approximately 0.1 inch and a circumferential extent of 40 degrees. The faces of the auxiliary poles extend 10 degrees in a circumferential direction. The depressions 12d–22d have an arcuate cross section with a radius of 0.25 inch and a depth of 0.025 inch.

In the absence of the pole face depressions 12d–22d, the cogging effect in the motor would correspond to preferred positions of the armature in which armature pole boundaries are opposite the centers of the field pole shoes 12a–22a. That is, the motor would exert a cogging torque tending to pull the armature into these positions, of which, as noted above, there are twenty-four in the illustrated embodiment of the invention. The reason for this is that when a pole boundary of the armature is opposite the mid-point of an unshaped field pole face, there is a minimum reluctance for the flux generated by the armature and passing between adjacent armature poles by way of an opposing field pole shoe 12a–22a. As will be understood by reference to FIG. 1, the depressions 12d–22d greatly reduce this effect. In the first place, the removal of ferromagnetic material from each pole shoe increases the reluctance of the arcuate path through the shoe, thereby reducing the "short-circuiting" effect of the pole shoe on the flux generated by the opposing north and south armature poles. Furthermore, there is relatively little change in the reluctance of that path when an armature pole boundary is opposite a depression. As a consequence the effect of cogging ripple is reduced to relatively insignificant proportions.

One might increase the physical angular extent of the field shoes 12a–22a and thereby eliminate the auxiliary poles 24–34. However, if that were done, the total flux passing through the main poles would be increased. The sizes of the necks 12b–22b would therefore have to be increased to avoid saturation. This, in turn would increase the length of wire needed for each of the coils 12c–22c with a concomitant increase in coil resistance and reduction in efficiency of the motor.

Because of the symmetrical configuration of the armature and field poles, the forces applied to the armature are also symmetrical. That is, as explained above, the forces are applied to the armature simultaneously by equally energized poles in a pole pair. These forces are thus equal in magnitude and opposite in direction. This reduces stresses on the motor shaft and bearings and undesirable vibrations resulting from unsymmetrical application of forces.

Figure 2:
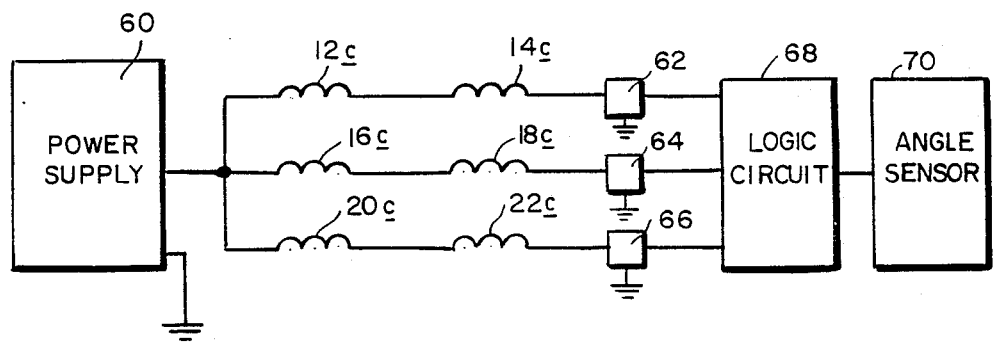
FIG. 2 is a schematic diagram of the motor, including the circuitry used to provide electrical power.

As shown in FIG. 2, the motor includes a power supply 60 that operates as a constant-current DC source. The supply 60 is connected to one end of each of the field coil pairs. The other ends of the respective coil pairs are returned to the power supply by way of ground connections through switches 62, 64 and 66. A logic circuit 68, which receives armature angle indications from an angle sensor 70, operates the switches in accordance with the coil-energizing sequence described above. With this arrangement there is only a single switch in series with each pair of energized coils and the power and torque losses resulting from voltage drops in switches are therefore minimized. Accordingly, the motor provides the high efficiency of a wye connected motor with minimal torque and cogging ripples, as desired for applications where smooth tension and motor speed are desired.

The foregoing description has been limited to a specific embodiment of this invention. It will be apparent, however, that the invention can be practiced in motors having other constructions than those disclosed in this specification with the attainment of some or all of the advantages of the invention. Therefore, it is the object of the appended claims to cover all such variations and modifications as come within the true spirit and scope of the invention.

For example, one might use a armature whose number of poles is not a multiple of four. In that case, the coils in each field coil pair would be connected to provide opposite magnetic polarities, relative to the armature, when current is passed through them. Also the power supply and associated switching circuitry would require a provision for revising the direction of currents through the coil pairs according to the angular position of the armature. This results from the fact that if, and only if, the number of armature poles is divisible by four, diametrically opposed armature poles will have the same polarity.

What is claimed as new and desired to be secured by Letters Patent of the United States is:

1. A multiple-phase brushless DC motor comprising:
   A. a field
      (1) having a plurality of pairs of diametrically opposed main field poles, the number of such pairs corresponding with the number of phases of the electrical excitation of said motor.
      (2) having a coil on each of said main field poles, the coils on each of said main field pole pairs being connected in series to form a coil pair, the coils of each of said coil pairs being connected so that current through the pair provides the same polarity in both of the poles of the main field pole pair,
      (3) with each of said main field poles having a pole face with a generally arcuate cross section, said cross section having a centrally disposed depression extending radially away from the face,
   B. an armature having
      (1) a plurality of poles and
      (2) permanent magnets for magnetizing the armature poles;
   C. the arcuate extent of each of the armature poles being greater than one-half of the pitch of said main field poles and substantially less than the main field pole pitch,
   D. the numbers of said main field poles and armature poles and the arcuate extent of the each of the main field poles being such that within any 180 degree sector no more than one boundary between said armature poles is opposite a space between two of said main field poles for any given armature position,
   E. said motor further comprising auxiliary poles disposed in the gaps between the main field poles.

2. The motor defined in claim 1 in which the armature poles form a substantially continuous surface of the armature facing the field.

3. The motor defined in claim 1 in which the number of said armature poles is greater than the number of main field poles.

4. The motor defined in claim 2 in which
   A. each of said main field pole faces has an active region of one-half the pitch of said field poles,
   B. when a boundary between two of said armature poles leaves an active region on one of said field pole faces during rotation of the motor, another boundary of one of said armature poles enters an active region of another of said field pole faces, so that during rotation of the armature a succession of said armature pole boundaries pass over a succession of active regions of said field pole faces.

5. The motor defined in claim 2 in which the number of said armature and said field poles is such that whenever a boundary of one of said armature poles enters an active region of a first one of said main field pole faces, a diametrically opposed armature boundary enters the active region of a field pole face diametrically opposed to said first one of said main field pole faces.

6. The motor defined in claim 5 including means for energizing said coil pairs, said energizing means energizing a pair of said coils when armature pole boundaries enter the active regions of the pole faces associated with the coil pair and de-energizing the coil pair when the armature pole boundaries leave the active regions of said associated pole faces.

7. The motor defined in claim 1 in which the depths of said depressions are such as to substantially eliminate the peaks in the torque characteristic corresponding to the central portions of the main field pole face accurate cross sections in the absence of said depressions.

8. The motor defined in claim 7 in which the depths of said depressions are such as to make the torque exerted on the armature when an armature pole boundary passes by one of said depressions slightly less than the torque exerted on the armature when the armature boundary is opposite a neighboring region of the pole face.

9. The motor as defined in claim 1, including a power supply including a power supply connected to one end of each of said coil pairs, switches connected between the other ends of said coil pairs and said power supply and means for energizing said power supply in succession through said coil pairs.

* * * * *